Feb. 24, 1948.　　　　H. A. WINTER　　　　2,436,467
VEHICLE RAMP
Filed Aug. 27, 1946
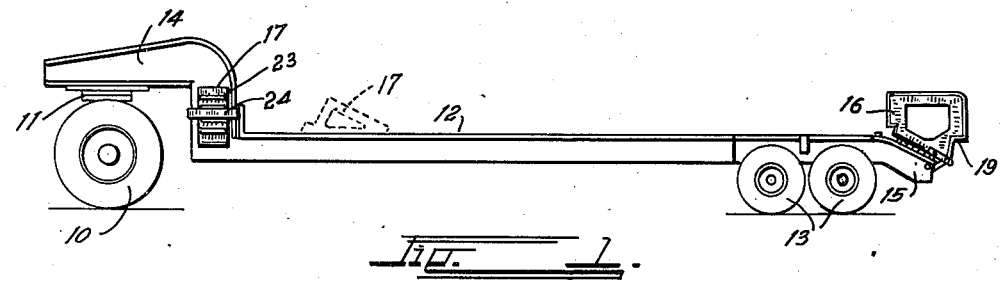
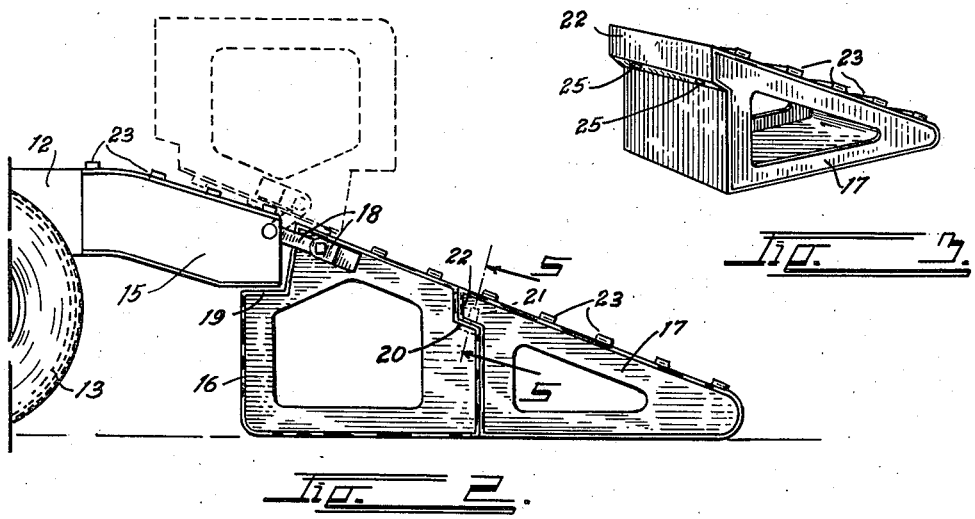
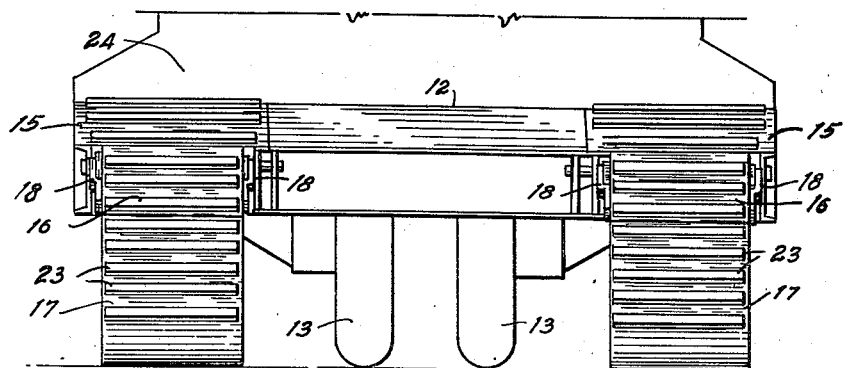
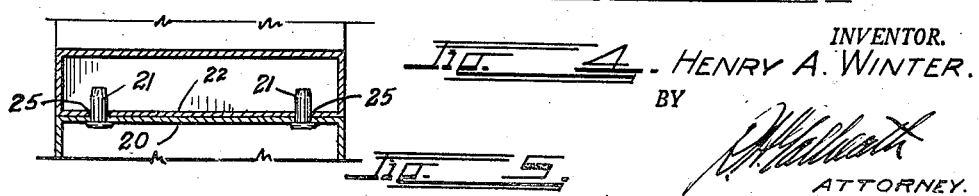
INVENTOR.
HENRY A. WINTER.
BY
ATTORNEY.

UNITED STATES PATENT OFFICE 2,436,467

VEHICLE RAMP

Henry A. Winter, Denver, Colo., assignor to Patents, Inc., Denver, Colo., a corporation of Colorado Application August 27, 1946, Serial No. 693,251

5 Claims. (Cl. 214—85)

This invention relates to a loading ramp for what is known as a low bed heavy duty trailer. Such trailers are used for transporting tanks, tractors and heavy machinery of various types.

The principal object of the invention is to provide a combination loading ramp and chock block for trailers of this type which will allow heavy equipment to be driven directly onto the trailer; which will relieve the load on the rear wheels of the trailer during the loading operation; and which will prevent forward and backward movement of the loaded equipment when in place upon the trailer.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of a typical low bed heavy duty trailer with the improved ramp in riding position thereon;

Fig. 2 is a side view of the invention ready for use as a ramp for loading the trailer;

Fig. 3 is a detailed perspective view of a portion of the ramp which is removable for use as a chock block;

Fig. 4 is an enlarged rear view of the trailer with the improved ramp in place thereon; and Fig. 5 is an enlarged detail section, taken on the line 5—5, Fig. 2.

In the drawing, the rear wheel of a tow car is indicated at 10 with its fifth wheel or turntable at 11. The bed of a heavy duty trailer is indicated at 12 with its rear supporting wheels at 13 and forward goose neck at 14. The goose neck 14 connects on the turntable 11 as is usual in this type of trailer construction.

In applying this invention to the trailer, the rear extremity of the bed 12 is inclined downwardly to form a load receiving platform 15. A loading ramp is hingedly connected at each side of the rear edge of the inclined loading platform.

Each loading ramp edge consists of a supporting block 16 and a terminal block 17. Each supporting block 16 is attached to the rear extremity of the platform 15 by means of two connecting links 18. Each block 16 is provided with a forwardly extending shelf 19 which, when the block is in the loading position, extends beneath the rear extremity of the platform 15 to receive and support the latter under the weight of the oncoming load. It is also provided with a rearwardly inclined shelf portion 20 from which a pair of retaining dowel pins 21 project upwardly and rearwardly. The terminal blocks 17 are formed with forwardly extending lips 22 which rest on the shelves 20 and are prevented from slipping therefrom by means of the dowel pins 21 which enter receiving openings 25 in the lips 22.

Traction cleats 23 are attached to and extend transversely across the upper inclined surfaces of both blocks 16 and 17 and across the portions of the platform 15 in alignment with the ramps. The upper surfaces of both blocks are inclined on a common angle corresponding to the incline of the platform 15. A receiving rack 24 is provided at each side of the goose neck 14 for receiving the two terminal blocks 17 when not in use.

Operation

Let us assume it is desired to drive a tractor or other large vehicle onto the trailer. The blocks 16 are lowered to the solid line position of Fig. 2 and the blocks 17 are attached thereto, as shown in Fig. 2 by means of the pins 21. The tractor may now be driven directly onto the trailer bed 12. When the oncoming vehicle reaches the platform 15 the weight thereof will force the bed downwardly, the links 18 allowing relative movement, until the platform 15 rests on the shelves 19. The blocks 16 now support the load and relieve the weight on the wheels 16 until the oncoming vehicle is in proper position on the bed 12.

When the vehicle is in proper place, the terminal blocks 17 are removed from the supporting blocks 16 and the latter are turned upwardly as shown in broken lines in Fig. 2 to provide a backstop or chock block to prevent rearward movement of the load. The cleats on the blocks 16 engage the cleats on the platform 15 so as to prevent rearward movement of the block 16. The terminal blocks 17 can be inverted on the bed 12 ahead of the load, as shown in broken line in Fig. 1, to act as chock blocks to prevent forward movement thereof. If forward chock blocks are not needed, the blocks 17 are slipped into the receiving racks 24 until again needed for ramp purposes.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A combination chock block and ramp for a heavy duty trailer comprising: a first block member having an inclined upper surface; means hingedly connecting said first block member to said bed so that when lowered, it will form a downward incline from the rear of said bed and when raised and folded will rest on said bed to form a backstop; a second inclined block; means for securing said second block to said first block to form a continuation of the inclined upper surface thereof; and a forwardly projecting shelf on said first block positioned to receive and support the rear extremity of said bed.

2. A combination chock block and ramp for a heavy duty trailer comprising: a first block member having an inclined upper surface; means hingedly connecting said first block member to said bed so that when lowered, it will form a downward incline from the rear of said bed and when raised and folded will rest on said bed to form a backstop; a second inclined block; means for securing said second block to said first block to form a continuation of the inclined upper surface thereof; a forwardly projecting shelf on said first block positioned to receive and support the rear extremity of said bed; a second shelf extending rearwardly from said first block; and a lip formed on said second block resting on said second shelf.

3. A combination chock block and ramp for a heavy duty trailer comprising: a first block member having an inclined upper surface; means hingedly connecting said first block member to said bed so that when lowered, it will form a downward incline from the rear of said bed and when raised and folded will rest on said bed to form a backstop; a second inclined block; means for securing said second block to said first block to form a continuation of the inclined upper surface thereof; a forwardly projecting shelf on said first block positioned to receive and support the rear extremity of said bed; a second shelf extending rearwardly from said first block; a lip formed on said second block resting on said second shelf; and dowel pins securing said lip on said second shelf.

4. A combination chock block and ramp for a heavy duty trailer comprising: a first block member having an inclined upper surface; means hingedly connecting said first block member to said bed so that when lowered, it will form a downward incline from the rear of said bed and when raised and folded will rest on said bed to form a backstop; a second inclined block; means for securing said second block to said first block to form a continuation of the inclined upper surface thereof; a forwardly projecting shelf on said first block positioned to receive and support the rear extremity of said bed; a second shelf extending rearwardly from said first block; a lip formed on said second block resting on said second shelf; dowel pins securing said lip on said second shelf, said second block being removable; and a receiving rack on said trailer for receiving said second block when removed from said first block.

5. A combination chock block and ramp for a heavy duty trailer comprising: a first block member having an inclined upper surface; means hingedly connecting said first block member to said bed so that when lowered, it will form a downward incline from the rear of said bed and when raised and folded will rest on said bed to form a backstop; a second inclined block; means for securing said second block to said first block to form a continuation of the inclined upper surface thereof; cleats formed on said first block; coacting cleats formed on said bed so that when said first block is folded on said bed said cleats will engage to prevent rearward movement of the former.

HENRY A. WINTER.

REFERENCES CITED

The following references are of record in the file of this patent:

UNITED STATES PATENTS

| Number | Name | Date |
|---|---|---|
| 577,500 | Wilson | Feb. 23, 1897 |
| 2,100,694 | Judd | Nov. 30, 1937 |
| 2,318,802 | Reid | May 11, 1943 |
| 2,323,270 | Van Zelm | June 29, 1943 |

FOREIGN PATENTS

| Number | Country | Date |
|---|---|---|
| 814,016 | France | Mar. 8, 1937 |